Dec. 23, 1930.  L. D. STOPPEL  1,785,795
ASPARAGUS CUTTING MACHINE
Filed April 29, 1927  3 Sheets-Sheet 3
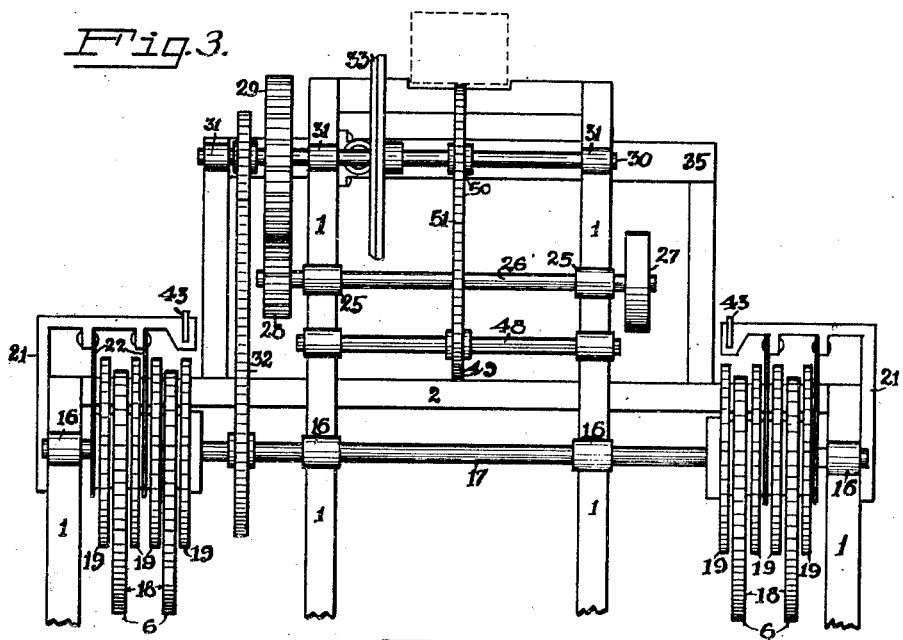
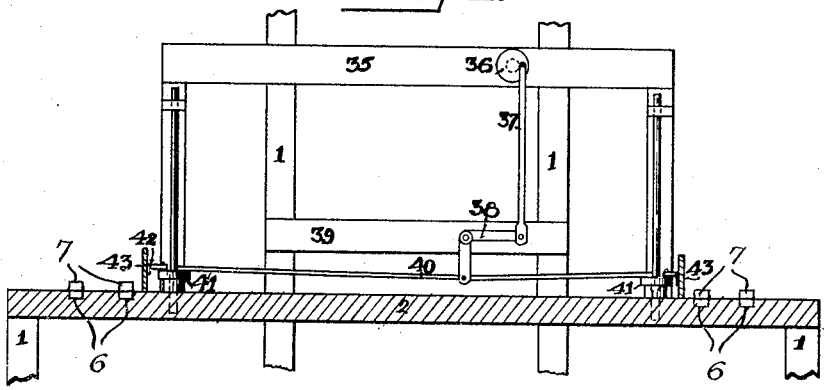
INVENTOR.
LOUIS D. STOPPEL
BY
J.E. Trabucco
ATTORNEY.

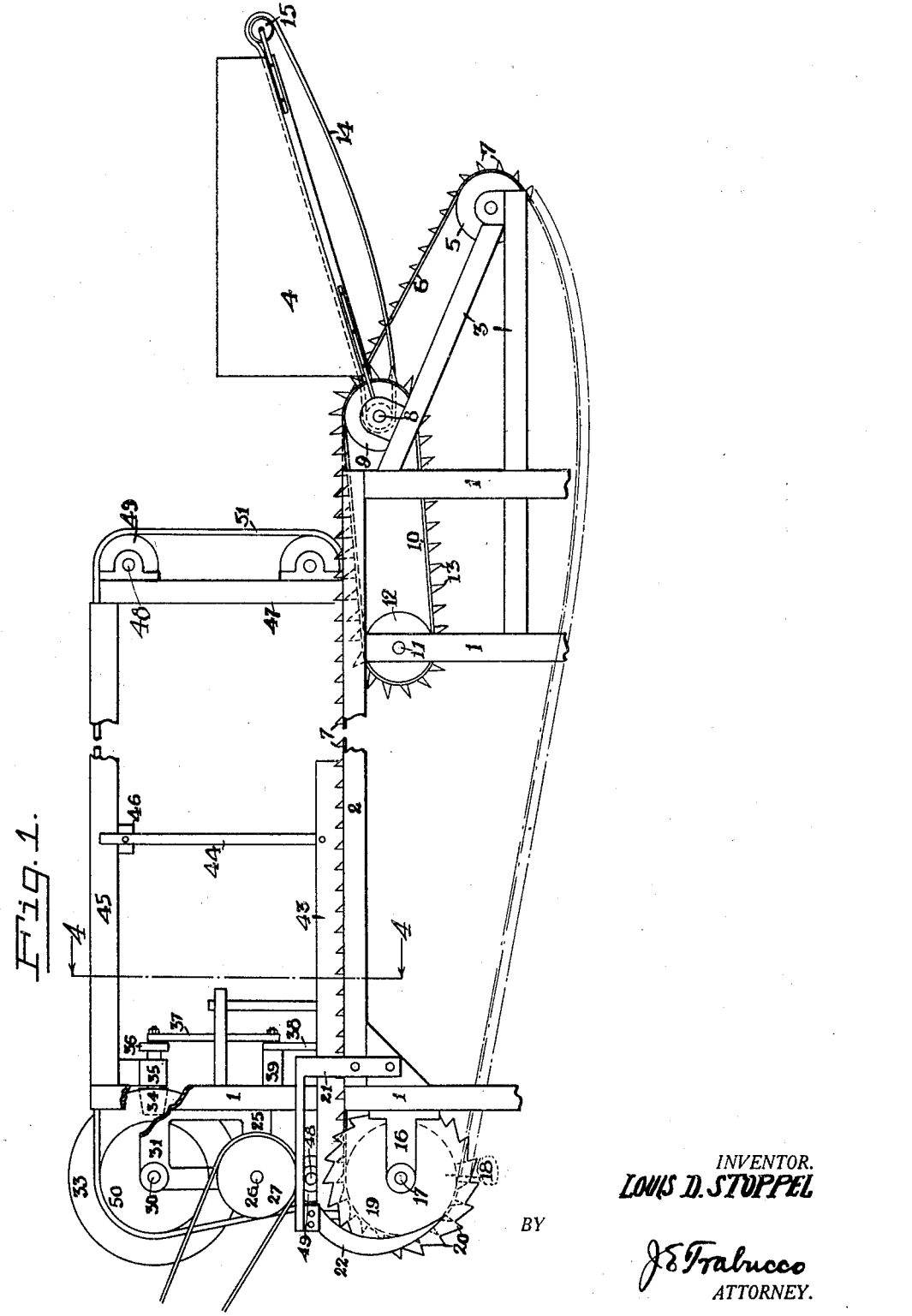
Dec. 23, 1930.  L. D. STOPPEL  1,785,795
ASPARAGUS CUTTING MACHINE
Filed April 29, 1927   3 Sheets-Sheet 1
INVENTOR.
LOUIS D. STOPPEL
BY
ATTORNEY.

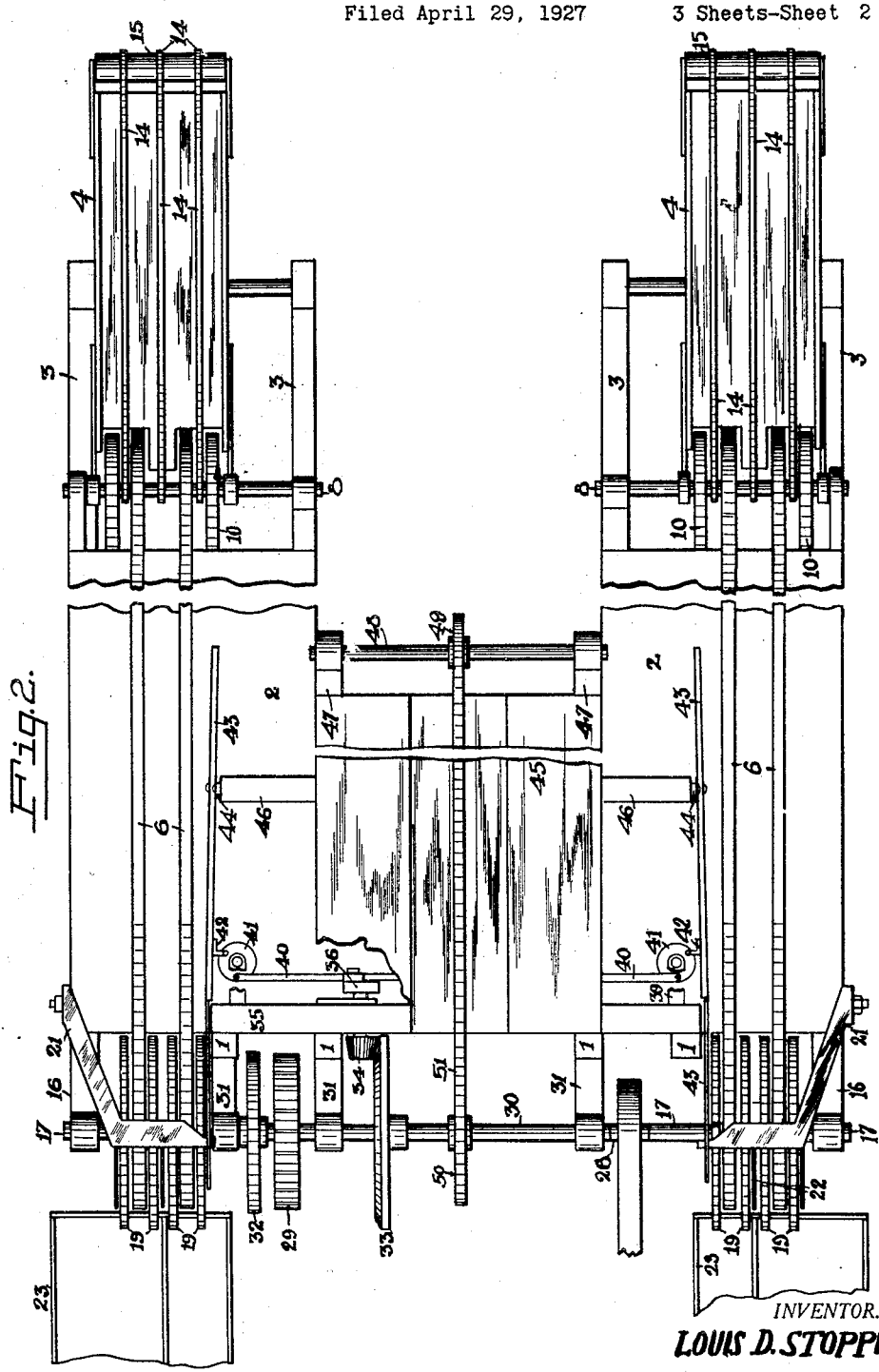

Patented Dec. 23, 1930 1,785,795

UNITED STATES PATENT OFFICE

LOUIS D. STOPPEL, OF ISLETON, CALIFORNIA

ASPARAGUS-CUTTING MACHINE

Application filed April 29, 1927. Serial No. 187,543.

This invention relates to an asparagus cutting machine wherein is provided means for cutting asparagus stems into a plurality of parts.

An object of my invention is to provide an asparagus cutting machine adapted to cut the tips from asparagus stems.

Another object of my invention is to provide a machine having means for automatically conveying a quantity of asparagus stems into engagement with a plurality of knives adapted to cut them into a plurality of parts.

Another object of my invention is to provide an asparagus cutting machine of novel construction which is adapted to cut tips of the same length from a plurality of asparagus stems, of different lengths.

Further objects and advantages more or less apparent will present themselves or will be pointed out in the description to follow.

In the accompanying drawings:

Fig. 1 is a side plan view of an asparagus cutting machine embodying my invention;

Fig. 2 is a top elevation of the same;

Fig. 3 is an end cross sectional view of the same; and

Fig. 4 is a view of the asparagus guiding means taken on the line 4—4 of Fig. 1.

The drawings show two cutting units having the same construction, each operated by the same means, and both mounted on frames of approximately the same construction and dimensions.

Referring to the drawings, the numeral 1 represents the legs of the supporting frames having a horizontally disposed board 2 mounted thereon which is provided therein with two pair of longitudinally extending grooves.

The front four legs of the frame serve to support two pair of pulley supporting members 3 which have hoppers 4 secured thereto. The hoppers are disposed in inclined positions at the front of the operating mechanism, and are adapted to receive a plurality of asparagus stems which are placed therein in crosswise positions.

Secured to revolvable shafts which are mounted on the extreme front end of the supporting members 3 are chain wheels 5, over which extend endless flexible chains 6. The outer surface of each of the chains 6 is provided with a plurality of projecting lugs 7, which serve to assist in conveying the asparagus stems from the hopper 4 to the rear part of the machine.

Secured to revolvable shafts 8 which are mounted on the supporting members 3 adjacent the top end of the front legs 1, are chain wheels or sprockets over which the chains 6 extend, and also mounted on this shaft are chain wheels or sprockets 9 which have endless flexible chains 10 located thereon.

Secured to a shaft 11 which is revolvably secured within the legs 1 located immediately to the rear of the extreme front legs, are sprockets 12 which have the chains 10 located thereon. The chains 10 are provided on their outer surfaces with a plurality of lugs 13 which are slightly larger in size than the lugs 7 of chains 6. The lugs 13 are adapted to engage with the asparagus stems located in the lower end of the hopper 4 and to assist in positioning them on the chains 6 between the lugs 7 thereof.

Secured to the shaft 8 are sprockets having flexible chains 14 thereon, and revolvably mounted at the front end of the hoppers 4 are pulleys or sprockets 15, over which the said chains extend. The chains 14 are adapted to move along the bottom of the hoppers 4, and serve to convey asparagus stems to the lower end of the said hopper where they are intercepted by the lugs 7 and 13 of chains 6 and 10.

Revolvably supported by end members 16 which are secured to and project from the rear legs 1 is a shaft 17, having sprockets 18 attached thereto. The chains 6 extend over the sprockets 18 and are adapted to move within the grooves located in the board 2 upon actuation of the sprockets.

Secured on the shaft 17 and located on each side of the sprockets 18, are wheels 19 which are provided at their circumferences with a plurality of teeth 20. Attached to the board 2 are blade supporting members 21 which have a plurality of arcuate cutting blades 22 secured thereto. The cutting blades, which are two in number for each unit, extend downwardly with one of them located between the two innermost wheels 19 and the other of them located outside and adjacent the outermost of the said wheels 19.

When the chains 6 are being moved with the asparagus stems thereon, the teeth 20 of the wheels 19 intercept each asparagus stem as it reaches the wheels and carries it around so that the cutting blades 22 may cut it into three parts. Parts of the cut asparagus stems fall beneath the wheels 19, while other parts drop into receptacles 23.

Suitably secured to two of the rear legs 1 are rearwardly extending supports 25, and revolvably mounted in the said supports 25 is a shaft 26 which has a driving pulley 27 secured thereon. The driving pulley is connected with a source of power such as a motor by a suitable belt which extends over the same. Secured on the opposite end of the shaft 26 is a gear 28 which meshes with a larger gear 29 located above the same. The gear 29 is secured to a revolvable shaft 30 which is supported within supporting members 31 that are attached to two of the rear legs 1.

Secured on the shaft 30 is a sprocket over which an endless chain 32 extends, and secured to the shaft 17 is a similar sprocket having the said chain extending over it. The chain 32 serves to transfer power from the shaft 30 to the shaft 17 for the purpose of operating the various chains and wheels used in conveying the asparagus stems from the hoppers to the cutting blades.

Secured on the shaft 30 is a large gear 33 having teeth thereon which mesh with the teeth of a small bevel gear 34. The bevel gear is secured to a shaft which revolvably extends through a horizontally extending support 35, and affixed to the said shaft is a crank disk 36 which is adapted to revolve with the said bevel gear.

Pivoted eccentrically to the wheel 36 is a downwardly extending rod 37, the said rod being pivotally connected at its lower end to one end of a bell crank 38. The bell crank 38 is pivotally supported on a horizontally extending supporting member 39 through a pin or bolt as indicated.

The opposite end of the bell crank 38 is pivotally connected by a pin to a horizontally extending rod 40, the ends of which are pivotally connected to the upper surfaces of horizontally disposed crank disks 41 at points near the circumferential edge thereof.

The disks 41 which are pivotally mounted on the board 2 have angle irons 42 pivotally attached thereto at points off center by suitable pins, and the said angle irons are secured to guide members 43 which are disposed in a vertical position adjacent the inside runs of chains 6. The rear ends of the guide members 43 are supported for slidable motion by the supporting members 21 while their opposite ends are movably supported by upright rods 44 which are swingingly attached to the said guide members by suitable pins and to a top frame member 45 through outwardly extending supports 46.

The front portions of the guide members are positioned farther away from the inside runs of chains 6 than are the rear portions thereby enabling the tips of the asparagus stems to be properly aligned before they are conveyed by the chains 6 to the cutting blades 22.

The guide members 43 are moved backwardly and forwardly for the purpose of moving the asparagus stems into proper positions, through bevel gear 34, which rotates the crank disk 36, thereby moving the said guide members through the action of the rod 37, the bell crank 38, the rod 40 and the crank disks 41.

The top frame member 45 is supported above the boards 2 by two of the rear legs 1 and by two upright members 47 which are located at the front end thereof. Revolvably supported by the rear legs 1 and the upright members 47 are three shafts as at 48 having each a sprocket or chain wheel as at 49 secured thereto. A fourth sprocket 50 is secured to shaft 30, and an endless chain 51 extends over the sprockets 49 and 50 and across the top member 45, the said chain being adapted to convey a box of asparagus stems from the front end of the top member to the rear end thereof and is arranged with a guiding channel or ways as shown in Figs. 2 and 3 to keep such boxes in place on the chain, a box being dotted in position in Fig. 3.

It is apparent to those skilled in the art that my invention may be satisfactorily embodied in other forms than that shown herein, so for this and other reasons I desire it understood that the appended claims will define the limits my invention may assume.

In operation, asparagus or "grass" as it is called in the trade is brought to the machine from the fields in boxes with the tips or edible ends all pointing one way, and the grass is placed in either hopper 4 with the tips pointing inward, or so as to be in position for the guide members 43 to operate against the extreme ends of the tips.

The asparagus as placed in the hoppers is of varying lengths and it is essential for canning purposes that the stalks be cut a definite length measured from the extreme tip of each piece for the table pack, while another headless section is cut from the stalk below the table section to serve for soup making and the like.

Knives 22 are spaced to cut the stalks as described and the receptacles 23 are partitioned as shown so as to keep the tips and the intermediate cuts separated, while the useless butts will fall away from the outermost knife blade before reaching the receptacle.

As the grass travels along the board on chains 6 the slanting guides or tip aligning devices 43 begin to operate against the extreme tips of the grass by a gentle striking action combined with a longitudinal motion in direction of the travel of the grass. The peculiar motion of the tip aligning guides or boards 43 is the result of their swinging suspension at one end, sliding support at the other end, and position of their pivotal connection to crank disks 41, and oscillating movement of these disks through means of the crank disk drive 36.

By study of Fig. 2 it will be seen that as the conveyor chains travel toward the knives the aligning guides 43 will intermittently travel with the chains and also toward them upon one direction of oscillation of disks 41 and upon reverse direction will travel away from the chains in reverse direction to the chain travel.

This results in a gentle intermittent tapping against the extreme tips of the grass to force their tips all to alignment, and since the aligning devices while tapping the grass tips also travel with them each time they are tapped it prevents bruising the delicate points of the tender grass, a very important feature since any injury to the tips would greatly lower their quality rating in the market.

The machine is relatively long, and the reversely traveling conveyor chain 51 provides for returning boxes of grass from the cutting end of the machine in cases where the cannery layout requires.

Having described my invention, what I claim is:

1. An asparagus cutting machine comprising, a plurality of stationary cutting blades, a plurality of endless chains arranged for conveying asparagus stems toward the blades, means for aligning the tips of the asparagus stems as the asparagus stems are being conveyed toward the cutting blades comprising a guide arranged adjacent the path of travel of the asparagus and mounted for movement toward and from the same, means for intermittently so moving said guide to strike the extreme ends of the asparagus, and means for lifting the asparagus stems from the chains and bringing them into contact with the blades.

2. In a machine of the character described, a traveling conveyor arranged to convey asparagus stems with tips extending transversely of the conveyor, and means actuated simultaneously with the conveyor arranged and adapted to intermittently strike the extreme points of the asparagus and align the tips thereof, and means for cutting off said stems with tips aligned.

3. In a machine of the character described, a traveling conveyor arranged to convey asparagus stems with tips extending transversely of the conveyor, and aligning means actuated simultaneously with the conveyor arranged and adapted to intermittently strike the extreme points of the asparagus and align the tips thereof, and means for cutting off said stems with tips aligned, said aligning means being mounted and actuated to intermittently travel in direction of the conveyor travel during its intermittent striking movement.

4. In a machine of the character described, a traveling conveyor arranged and adapted to convey asparagus stems with tips extending transversely of the conveyor, a tip aligning guide extending along the conveyor in a slanting manner so as to force the ends of the tips toward alignment, means for oscillating said guide against the ends of the tips while the conveyor is in motion for aligning the tips of the asparagus on the conveyor, and means at the end of the conveyor for cutting off the asparagus stems with tips aligned.

5. In a machine of the character described, an endless chain conveyor passing over wheels at both ends and the conveyor arranged to support and convey asparagus stems lying transversely thereon in spaced relation, teeth rotating concentrically with the chain wheel at the delivery end of the conveyor arranged to pass to the sides of the conveyor chain and lift the asparagus stems therefrom with the stems lying between the teeth, said teeth spaced in conformity with the spacing of the asparagus stems, and a knife against which the asparagus is carried by said teeth.

6. In a machine of the character described, a multiple strand endless chain conveyor passing over wheels at both ends and the conveyor arranged to support and convey asparagus stems lying transversely thereon in spaced relation, teeth rotating concentrically with the chain wheel at the delivery end of the conveyor arranged to pass between the conveyor chains and lift the asparagus stems therefrom with the stems lying between the teeth, said teeth spaced in conformity with the spacing of the asparagus stems, and a knife against which the asparagus is carried by said teeth.

LOUIS D. STOPPEL.